(12) United States Patent
Fujimori et al.

(10) Patent No.: US 7,233,388 B2
(45) Date of Patent: Jun. 19, 2007

(54) DISTANCE MEASURING METHOD, DISTANCE MEASURING DEVICE USING SAME, AND DISTANCE MEASURING STRUCTURE USING SAME

(75) Inventors: Shingo Fujimori, Kakegawa (JP); Tadamitsu Iritani, 10-17, Minamiokinosu 1-chome, Tokushima-shi, Tokushima (JP); Tetsuji Uebo, 10-6, Nakabusa, Iwade-cho, Naga-gun, Wakayama (JP)

(73) Assignees: NEC Corporation, Tokyo (JP); Tadamitsu Iritani, Tosushima (JP); Tetsuji Uebo, Wakayama (JP)

( * ) Notice: Subject to any disclaimer, the term of this patent is extended or adjusted under 35 U.S.C. 154(b) by 274 days.

(21) Appl. No.: 10/827,248

(22) Filed: Apr. 20, 2004

(65) Prior Publication Data
US 2005/0018170 A1   Jan. 27, 2005

(30) Foreign Application Priority Data
Apr. 21, 2003   (JP)   ............................. 2003-115936

(51) Int. Cl.
*G01C 3/08* (2006.01)
(52) U.S. Cl. ............... 356/4.01; 356/4.02; 356/4.03
(58) Field of Classification Search .............. 356/4.1
See application file for complete search history.

(56) References Cited

U.S. PATENT DOCUMENTS 5,748,295 A * 5/1998 Farmer ................ 356/5.09
6,373,558 B1 * 4/2002 Hasson ................ 356/4.07
2002/0024652 A1 * 2/2002 Ooga ................ 356/28.5

FOREIGN PATENT DOCUMENTS

| JP | S38-1257 | | 2/1963 |
| JP | S58-198781 | A | 11/1983 |
| JP | S59-142485 | A | 8/1984 |
| JP | H01-219583 | A | 9/1989 |
| JP | H02-304387 | A | 12/1990 |
| JP | H05-203412 | A | 8/1993 |
| JP | H05-281341 | A | 10/1993 |
| JP | H06-160082 | A | 6/1994 |
| JP | 2002-296344 | A | 10/2002 |
| JP | WO 02079799 | * | 10/2002 |
| JP | 2002-357656 | A | 12/2002 |

* cited by examiner

*Primary Examiner*—Thomas H. Tarcza
*Assistant Examiner*—Luke Ratcliffe
(74) *Attorney, Agent, or Firm*—Sughrue Mion, PLLC

(57) ABSTRACT

A distance measuring method simultaneously measures a distance between a distance measurement system (10A) and a measurement object (M), and a relative speed therebetween. In the method, the distance measurement system sends an electromagnetic wave toward the measurement object as a traveling wave while changing a frequency thereof. The measurement object reflects the traveling wave to produce a reflected wave. The traveling wave and the reflected wave interfere with each other to produce a standing wave. The distance measurement system detects the amplitude of the standing wave and produces an amplitude signal representing the amplitude of the standing wave. Based on the produced amplitude signal, the distance measuring system derives the distance and the relative speed between the distance measurement system and the measurement object.

21 Claims, 4 Drawing Sheets

DISTANCE MEASURING METHOD, DISTANCE MEASURING DEVICE USING SAME, AND DISTANCE MEASURING STRUCTURE USING SAME

This application claims priority to prior application JP 2003-115936, the disclosure of which is incorporated herein by reference.

BACKGROUND OF THE INVENTION

The present invention relates to a distance measuring method that uses a standing electromagnetic wave produced by interference between a traveling electromagnetic wave and a reflected electromagnetic wave irrespective of their frequencies to thereby measure a distance between a distance measurement system and a measurement object, and further relates to a distance measuring device and a distance measuring structure each using such a method.

As distance measuring devices using radio waves, there have been known radio wave radars using microwaves or milliwaves. These radio wave radars are classified into pulse radars, FMCW radars, and so forth depending on their modes, and recently, spread spectrum radars and CDMA radars have also been available.

Specifically, the pulse radar transmits a pulse signal toward a measurement object and measures a time from a time instant of the transmission of the pulse signal to a time instant when the pulse signal has returned after reflection from the measurement object, to thereby derive a distance from the radar to the measurement object. The FMCW radar transmits a frequency-swept continuous wave toward a measurement object and derives a distance from the radar to the measurement object based on a frequency difference between a transmission signal and a reflected signal. In this case, the moving speed of the measurement object can also be measured simultaneously. The spread spectrum radar and the CDMA radar are basically the same as the pulse radar and each measure the distance based on a propagation time going to and from the measurement object.

In case of those radio wave radars, however, since the minimum detectable distance is several tens of meters or more, there is a problem that the measurement becomes difficult if the measurement object is located at a short distance. On the other hand, in case of a Doppler radar known as a radar other than the foregoing radars, there is a problem that although it is simple in structure and enables the measurement even if the measurement object is located at a short distance, the distance to the measurement object can not be measured if the measurement object is stopped. Further, in case of those conventional radars, there is a problem that when a plurality of radars are simultaneously used nearby, since each of their receivers has no means to avoid reception of signals transmitted from the other radars, the measurement error increases or the measurement is disabled.

In view of this, JP-A-2002-357656 (Literature 1) has proposed a technique that enables measurement of a distance to a measurement object with high accuracy even if the measurement object is located at a short distance. The technique of Literature 1 is based on an idea that when an electromagnetic wave is transmitted from an electromagnetic wave generating source toward a measurement object as a traveling wave, if there occurs a reflected wave from the measurement object, a standing wave is produced irrespective of their frequencies. Specifically, this technique calculates a period of amplitude of the standing wave at a detection point that is offset by a predetermined distance from the electromagnetic wave generating source toward the measurement object and derives a distance between the detection point and the measurement object based on the calculated period.

The technique of Literature 1 is effective when the measurement object and a distance measurement system are both stopped or moving at the same speed (when the relative speed therebetween is zero). However, there is a difficulty that when the relative speed is not zero, the measurement error increases to disable accurate measurement of the distance to the measurement object.

As other techniques relating to the distance measurement, JP-A-H05-203412 (Literature 2) discloses a device that measures a position where the refractive index of light changes, JP-A-S38-1257 (Literature 3) or JP-A-S58-198781 (Literature 4) discloses a distance measuring device using a light beam, and JP-A-H06-10082 (Literature 5) discloses an optical distance measuring device. The techniques of Literatures 2 to 5, however, do not even use the standing wave and therefore can not accurately measure the distance to the measurement object.

Further, JP-A-S59-142485 (Literature 6) discloses a distance measuring method, and JP-A-H05-281341 (Literature 7) discloses a method and device for distance measurement. The technique of Literature 6 changes a frequency to measure a resonant frequency and derives a distance from the resonant frequency. The technique of Literature 7 relates to measurement of a distance based on a period of a standing wave. However, either Literature 6 or Literature 7 does not positively utilize the standing wave and therefore can not achieve a measurement accuracy that is satisfactory.

Further, JP-A-2002-296344 (Literature 8) or JP-A-H01-219583 (Literature 9) discloses a distance measuring device, and JP-A-H02-304387 (Literature 10) discloses a distance measuring method using interference of electromagnetic waves.

The technique of Literature 8 carries out distance measurement with respect to a stationary object by the use of a Doppler sensor. Specifically, the distance is measured using a waveform of a standing wave between the sensor and the measurement object. However, when the relative speed therebetween is not zero, the measurement error increases so that a satisfactory measurement accuracy can not be achieved.

The technique of Literature 9 aims to perform frequency modulation relative to a laser diode with high accuracy in the optical heterodyne interference method that obtains information from optical beats, and employs a counter for counting signals corresponding to a beat component. In this technique, use is made of a bandpass filter for extracting only those frequency components around the beat component and, by changing the frequency with a modulating signal such as a sawtooth wave to measure a level corresponding to an optical beat signal caused by a transmission signal and a reception signal, the distance is measured. To this end, the measurement is difficult when the measurement object is located at a short distance.

The technique of Literature 10 enables measurement of a short distance using interference between a transmitted electromagnetic wave and a reflected wave from an obstacle (measurement object). Specifically, a reflected wave obtained by transmission of an electromagnetic wave, hitting thereof on the obstacle, and reflection thereof from the obstacle is made an object to be measured. Since the transmitted electromagnetic wave and the reflected wave are individually utilized, it basically requires a considerable time to carry out distance measurement once although depending on a length of time for transmission of the electromagnetic wave and the number of cycles thereof.

SUMMARY OF THE INVENTION

It is therefore an object of the present invention to provide a distance measuring method that, even when a relative speed between a measurement object and a distance measurement system is not zero, can accurately measure both a distance from the distance measurement system to the measurement object and the relative speed therebetween simultaneously.

It is another object of the present invention to provide a distance measuring device applied with the foregoing distance measuring method.

It is still another object of the present invention to provide a distance measuring structure comprising a plurality of such distance measuring devices.

Other objects of the present invention will become clear as the description proceeds.

According to an aspect of the present invention, there is provided a distance measuring method for measuring a distance between a distance measurement system and a measurement object. The method comprises the steps of (1) sending a first electromagnetic wave toward the measurement object as a first traveling wave, the measurement object reflecting the first traveling wave to produce a first reflected wave, (2) changing a frequency of the first traveling wave, (3) detecting an amplitude of a first standing wave at a first position of the distance measurement system and producing a first amplitude signal representing the amplitude of the first standing wave, the first standing wave produced by interference between the first reflected wave and the first traveling wave, and (4) executing a first calculation using the first amplitude signal to derive a first distance between the first position and the measurement object and a first relative speed between the first position and the measurement object.

According to another aspect of the present invention, there is provided a distance measuring device for measuring a distance to a measurement object, the device comprising a first C for producing a first electromagnetic wave, a first transmission section connected to the first electromagnetic wave generator for sending the first electromagnetic wave toward the measurement object as a first traveling wave, wherein the measurement object reflects the first traveling wave to produce a first reflected wave, a first frequency control section connected to the first electromagnetic wave generator for changing a frequency of the first traveling wave, a first amplitude detecting section for detecting an amplitude of a first standing wave at a first position and producing a first amplitude signal representing the amplitude of the first standing wave, the first standing wave produced by interference between the first reflected wave and the first traveling wave, and a first arithmetic section connected to the first amplitude detecting section for executing a first calculation using the first amplitude signal to derive a first distance between the first position and the measurement object and a first relative speed between the first position and the measurement object.

According to still another aspect of the present invention, there is provided a distance measuring structure for measuring a distance to a measurement object, the structure comprising a plurality of distance measuring devices each as described above, a synchronization control device connected to the distance measuring devices for synchronizing operations of the first arithmetic sections provided in the distance measuring devices, respectively, and a coordinate calculating device connected to the distance measuring devices for calculating space coordinates of the measurement object based on the first distances and the first relative speeds derived in the distance measuring devices, respectively, and a positional relationship of the first amplitude detecting sections provided in the distance measuring devices, respectively.

DESCRIPTION OF THE PREFERRED EMBODIMENT

At the outset, description will be briefly made of a technical outline of a distance measuring method according to the present invention.

Figure 1:
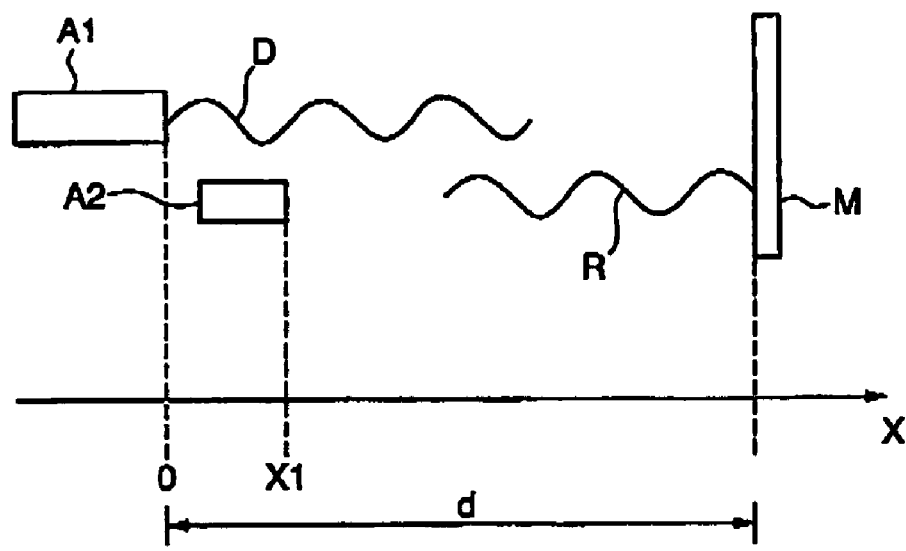
FIG. 1 is an explanatory diagram showing a relationship between a traveling electromagnetic wave and a reflected electromagnetic wave from a measurement object, for explaining the principle of the present invention.
Figure 2:
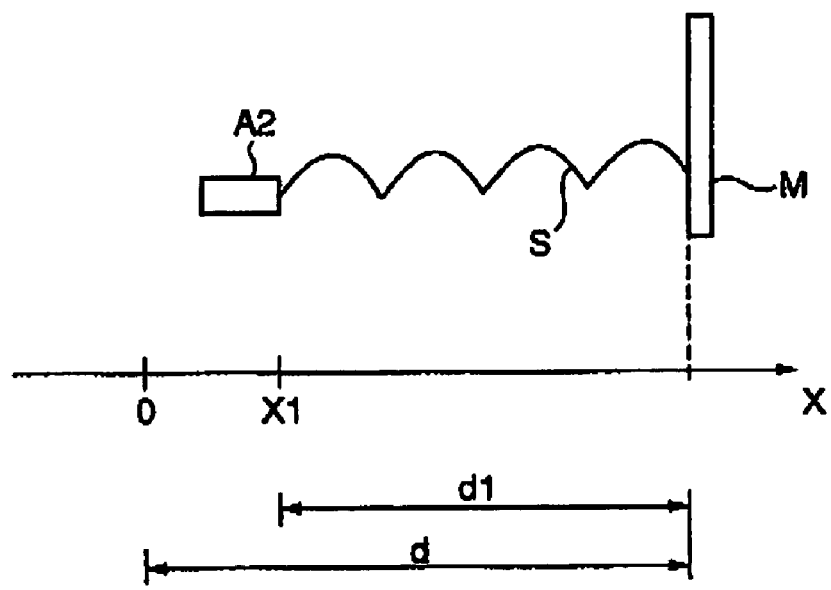
FIG. 2 is an explanatory diagram showing a standing electromagnetic wave produced by interference between the traveling electromagnetic wave and the reflected electromagnetic wave, for explaining the principle of the present invention.

Referring to FIGS. 1 and 2, description will be given about a principle that a standing electromagnetic wave S is formed in a distance d from an electromagnetic wave generating source A1 to a measurement object M. FIG. 1 shows a relationship between a traveling electromagnetic wave D and a reflected electromagnetic wave R, relating to the traveling wave D, from the measurement object M. FIG. 2 shows the standing wave S produced by interference between the traveling wave D and the reflected wave R.

In FIG. 1, when an electromagnetic wave with a frequency f is transmitted into a propagation medium such as air or water from the electromagnetic wave generating source A1 toward the measurement object M, the electromagnetic wave is transmitted or propagated in the propagation medium as the traveling wave D. In the traveling wave D, a value VD at a position located at an arbitrary distance x from the electromagnetic wave generating source A1 is given by the following equation (1) as a function of the frequency f and the distance x.

$$VD(f,x) = \exp(j2\pi f/c \cdot x) \tag{1}$$

where c represents the velocity of light.

The traveling wave D continues to be propagated in the propagation medium, then reaches the measurement object M located at a distance d from the electromagnetic wave generating source A1. Thereupon, the traveling wave D is reflected on the measurement object M to become the reflected wave R. This reflected wave R is transmitted or propagated in the propagation medium from the measurement object M toward the electromagnetic wave generating source A1. In the reflected wave R, a value VR at a position located at an arbitrary distance x from the electromagnetic wave generating source A1 is given by the following equation (2) as a function of the frequency f and the distance x.

$$VR(f, x) = MR \cdot \exp\{j2\pi f/c \cdot (2d-x)\} \qquad (2)$$

Herein, MR represents a reflection coefficient of electromagnetic wave at the measurement object M and is given by the following equation (3) where $\gamma$ and $\phi$ represent constants, respectively.

$$MR = \gamma \cdot \exp(j\phi) \qquad (3)$$

When the traveling wave D and the reflected wave R interfere with each other, the standing wave S is formed as shown in FIG. 2. The amplitude of the standing wave S is measured at a detection point A2 that is offset by a distance x1 from the electromagnetic wave generating source A1 toward the measurement object M.

Given the distance d from the electromagnetic wave generating source A1 to the measurement object M, the distance x1 from the electromagnetic wave generating source A1 to the detection point A2, and a distance d1 from the measurement object M to the detection point A2, the following equation (4) is obtained.

$$d1 = d - x1 \qquad (4)$$

Therefore, an amplitude SP of the standing wave S detected at the detection point A2 is given by the following equation (5) as a function of the frequency f and the distance x1 where the velocity of light c is used.

$$SP(f, x1) = \{1 + \gamma^2 + 2\gamma \cos(2\pi f/c \cdot 2d1 + \phi)\}^{1/2} \qquad (5)$$

Specifically, the amplitude SP of the standing wave S at the position where the detection point A2 is located is periodic with respect to the frequency f of the traveling wave D produced from the electromagnetic wave generating source A1, and its period FT (note: having the dimension of the frequency) becomes c/2d1 and is thus inversely proportional to the distance d1 from the detection point A2 to the measurement object M. Therefore, by changing the frequency f of the traveling wave D, variable periods of the amplitude SP of the standing wave S can be derived at the position where the detection point A2 is located. This makes it possible to measure the distance d1 to the measurement object M.

Figure 3:
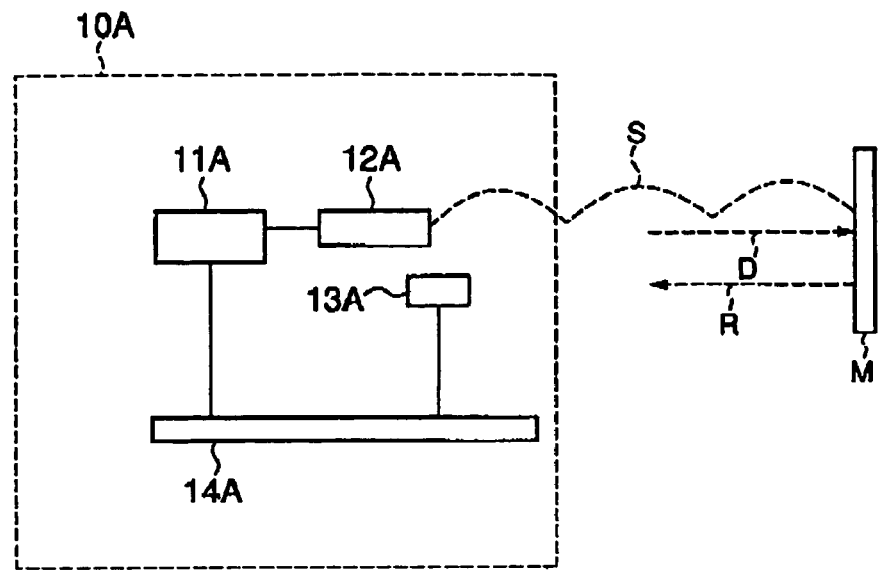
FIG. 3 is a block diagram for describing a distance measuring device according to a first preferred embodiment of the present invention.

Referring to FIG. 3, description will be made of a distance measuring system or device 10A according to a first preferred embodiment of the present invention.

The distance measuring device 10A comprises an electromagnetic wave generator 11A for producing an electromagnetic wave, a transmitter 12A connected as a transition section to the electromagnetic wave generator 11A for transmitting the electromagnetic wave toward a measurement object M as a traveling wave D, a detector 13A disposed at a position offset from the transmitter 12A toward the measurement object M for detecting a standing wave S, i.e. a composite wave of the traveling wave D and a reflected wave R, to produce a detection result, and a signal processor 14A connected to the electromagnetic wave generator 11A and the detector 13A. The signal processor 14A controls a frequency of the electromagnetic wave produced by the electromagnetic wave generator 11A. In this event, the electromagnetic wave generator 11A serves as a frequency control section. Further, the signal processor 14A calculates a variable period of amplitude, with respect to such a frequency, of the standing wave S using the detection result obtained from the detector 13A and, based on a result of the calculation, further calculates a distance (interval) from the measurement object M to the detector 13A.

The distance measuring device 10A measures the distance d1 between the detection point A2 and the measurement object M using the standing wave S. Specifically, it detects the amplitude of the standing wave S and, based on the detected amplitudes, takes into account a relative speed v between the distance measuring device 10A and the measurement object M to thereby calculate the distance d1 and the relative speed v simultaneously.

From a time t, the relative speed v, the distance d from the electromagnetic wave generating source A1 to the measurement object M, the distance x1 from the electromagnetic wave generating source A1 to the detection point A2, and the distance d1 from the measurement object M to the detection point A2, d2 is obtained as given by the following equations (6).

$$d2 = d1 - v \cdot t, \quad d1 = d - x1 \qquad (6)$$

The amplitude SP of the standing wave S and SPO representing the square of the amplitude SP are given by the following equations (7) and (8) (hereinafter collectively referred to as "the basic equation"), respectively, as functions of the frequency f of the electromagnetic wave, the distance x1, and the time t, where the constants $\gamma$ and $\phi$ of the reflection coefficient MR of the electromagnetic wave at the measurement object M and the velocity of light c are used.

$$SP(f, x1, t) = \{1 + \gamma^2 + 2\gamma \cos(2\pi f/c \cdot 2d2 + \phi)\}^{1/2} \qquad (7)$$

$$SPO(f, x1, t) = \{1 + \gamma^2 + 2\gamma \cos(2\pi f/c \cdot 2d2 + \phi)\} \qquad (8)$$

On the other hand, when there are a plurality of measurement objects M (a distance from the electromagnetic wave generating source to each measurement object is represented by $d_k$, k=1, 2, ..., n), SP (f, x1, t) and SPO (f, x1, t) are given by the following equations (9) and (10), respectively.

$$SP(f, x1, t) = |\exp(j2\pi f \circ x1/c) \circ \{1 + \sum_{k=1}^{n} Y_k \exp\{j(2\pi f/c \circ 2d2_k + \varphi_k)\}\}| \qquad (9)$$

$$\approx \left\{1 + 2\sum_{k=1}^{n} Y_k \cos(2\pi f/c \circ 2d2_k + \varphi_k)\right\}^{1/2}$$

where $\gamma \ll 1$.

$$SPO(f, x1, t) = |\exp(j2\pi f \circ x1/c)|^2 \circ \left|1 + \sum_{k=1}^{n} Y_k \exp\{j(2\pi f/c \circ 2d2_k + \varphi_k)\}\right|^2 \qquad (10)$$

$$\approx \left\{ 1 + 2\sum_{k=1}^{n} Y_k \cos(2\pi f/c \circ 2d2_k + \varphi_k) \right\} \quad 5$$

where $\gamma \ll 1$.

In the distance measurement, the frequency of the electromagnetic wave produced from the electromagnetic wave generating source A1 is increased and decreased according to a predetermined pattern or variably controlled at random. For example, the frequency of the electromagnetic wave is increased and decreased using a predetermined step frequency so as to have a waveform of a step increase/decrease pattern.

Figure 4:
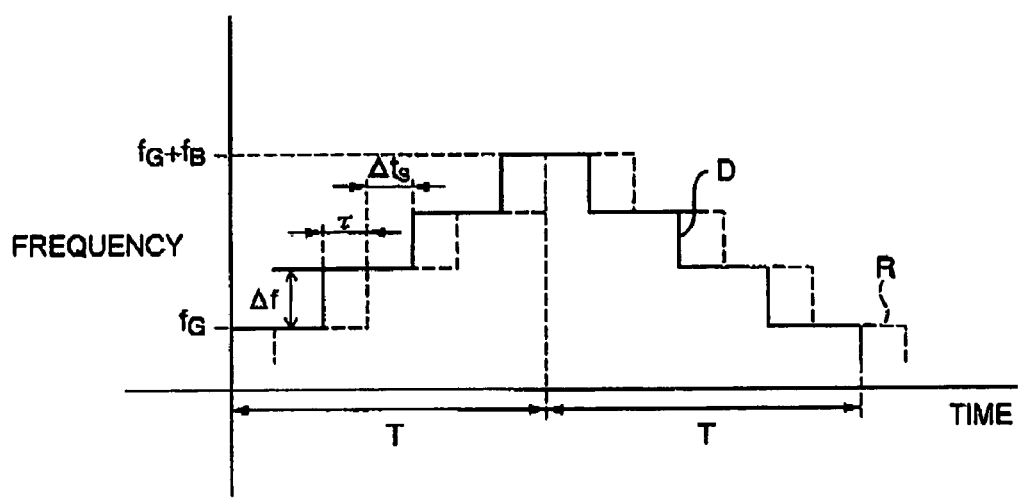
FIG. 4 is an explanatory diagram showing changes in frequency of a traveling electromagnetic wave and a reflected electromagnetic wave in terms of time by solid and broken lines, respectively.

Referring to FIG. 4 along with FIG. 3, one example will be described using the foregoing predetermined pattern that increases and decreases the frequency of the electromagnetic wave in the simplest way. FIG. 4 shows changes of the frequencies in terms of time with respect to the traveling wave D produced from the electromagnetic wave generator 11A and the reflected wave R from the measurement object M, wherein τ represents a delay time of the reflected wave R relative to the traveling wave D, Δts represents a measurable time, and Δf represents a step frequency.

After the frequency f of the traveling wave D is increased or decreased stepwisely by the step frequency Δf according to a step increase/decrease pattern, the detector 13A detects the amplitude of the standing wave S at an arbitrary time instant after a lapse of the delay time τ and under control of the signal processor 14A produces an amplitude signal. In this event, the detector 13a serves as an amplicutde detecting section, the signal processor 14A serving as a detection control section. The arbitrary time instant is controlled by the signal processor 14A serving as a time setting section in this event. Depending on the amplitude signal, the signal processor 14A serves as an arithmetic section to execute a predetermined calculation.

After the increase of the step frequency Δf from a frequency $f_G$, the frequency f of the traveling wave D changes to $f_G+\Delta f$. Since the traveling wave is transmitted propagated in the propagation medium at the constant speed (the velocity of light c), the wavelength of the traveling wave D changes. Therefore, the standing wave S formed in the propagation medium between the electromagnetic wave generator 11A and the measurement object M changes so that values of the amplitude signal produced by the detector 13A change. The electromagnetic wave generator 11A or the transmitter 12A repeats the process of changing the frequency f of the traveling wave D by the step frequency Δf until it reaches or coincides with a frequency $f_G+f_B$ as shown in FIG. 4.

When the measurement is carried out in the state where the traveling wave D is changed in frequency according to the predetermined pattern shown in FIG. 4, (f/c)·2d2+φ inside cos in the foregoing equation (8) of the basic equation is given by an expression of relation 1 of $(f_G/c)\cdot 2d1+\phi$ at t=0, while given by an expression of relation 2 of $((f_G+f_B)/c)\cdot 2(d1-v\cdot T)+\phi$ at t=T. An expression of relation 3 is given by $[2\{d1\cdot f_B - v\cdot T(f_G+f_B)\}/c = k1]$ which is obtained by setting $2\{d1\cdot f_B - v\cdot T(f_G+f_B)\}/c$ representing a value of (expression of relation 2−expression of relation 1) to k1. Similarly, with respect to (f/c)·2d2+φ inside cos in the foregoing equation (8) of the basic equation, $2\{d1\cdot f_B + v\cdot T(f_G-f_B)\}/c$ representing a value obtained by subtracting a value of (f/c)·2d2+φ at t=T from a value thereof at t=2T is set to k2 to thereby obtain an expression of relation 4 given by $[2\{d1\cdot f_B + v\cdot T(f_G-f_B)\}/c=k2]$. By solving simultaneous equations with respect to the variable d1 and the relative speed v from the expression of relation 3 and the expression of relation 4, there are obtained an expression of relation 5 of $d1=c\{k1(1-f_B/f_G)+k2(1+f_B/f_G)\}/(4\cdot f_B)$ and an expression of relation 6 of $v=c\cdot(k2-k1)/(4Tf_G)$.

Herein, k1 and k2 represent the values derived from the periods of the amplitude SP, with respect to the frequencies f of the traveling wave D, of the standing wave S that is produced when the frequency f is changed from $f_G$ to $f_G+f_B$ and from $f_G+f_B$ to $f_G$. Therefore, it is possible to simultaneously derive the distance d1 from the measurement object M to the detection point A2 and the relative speed v therebetween. Specifically, by applying the Fourier transformation or the like to the function of the basic equation through the predetermined calculation in the signal processor 14A, the period of the frequency f can be calculated so that k1 in the expression of relation 3 can be derived. Similarly, by changing the frequency f from $f_G+f_B$ to $f_G$ as shown in FIG. 4, k2 in the expression of relation 4 can be derived. Based on k1 and k2 thus derived, the signal processer 14A can be derived the distance d1 from the detector 13A to the measurement object M and the relative speed v between the distance measurement system including the electromagnetic wave generator 11A and the detector 13A, and the measurement object M. In this event, the signal processor 14A serves as an arithmetic section.

If the distance x1 from the electromagnetic wave generator 11A to the detector 13A is known, the distance d from the electromagnetic wave generator 11A to the measurement object M can be derived and, if the speed of the foregoing distance measurement system is known, the speed of the measurement object M can also be derived. In addition, instead of deriving the periods of the amplitude SP of the standing wave S with respect to the frequencies f of the traveling wave D, by deriving two or more frequencies f that make maximum and minimum the function defining the amplitude SP of the standing wave S with respect to the frequency f of the traveling wave D, it is possible to derive the distance d between the measurement object M and the electromagnetic wave generator 11A based on those derived frequencies f. Further, it is also possible to calculate the relative speed v and the distance d from a result obtained by applying the Fourier transformation to the function of the basic equation, which is derived when the frequency f of the traveling wave D is changed from $f_G$ to $f_G+f_B$ and from $f_G+f_B$ to $f_G$.

According to the distance measuring device as described above, it is possible to simultaneously derive the distance d1 from the detector 13A to the measurement object M, and the relative speed v between the distance measurement system and the measurement object M. Moreover, since the measurement is not affected by the time in which the electromagnetic wave produced from the electromagnetic wave generator 11A is reflected on the measurement object M and returns to the detector 13A, the distance to the measurement object M can be accurately measured even if it is a short distance of several tens of centimeters or less. Further, even when the amplitudes SP of a plurality of standing waves S formed between the detector 13A and a plurality of measurement objects M are simultaneously measured, variable periods of the amplitudes SP of the standing waves S can be respectively derived by applying the Fourier transformation to an amplitude signal obtained by the detector 13A to derive the periods. Therefore, it is possible to respectively measure the distances d1 and the relative speeds v between the plurality of measurement objects M and the detection point A2.

Figure 5:
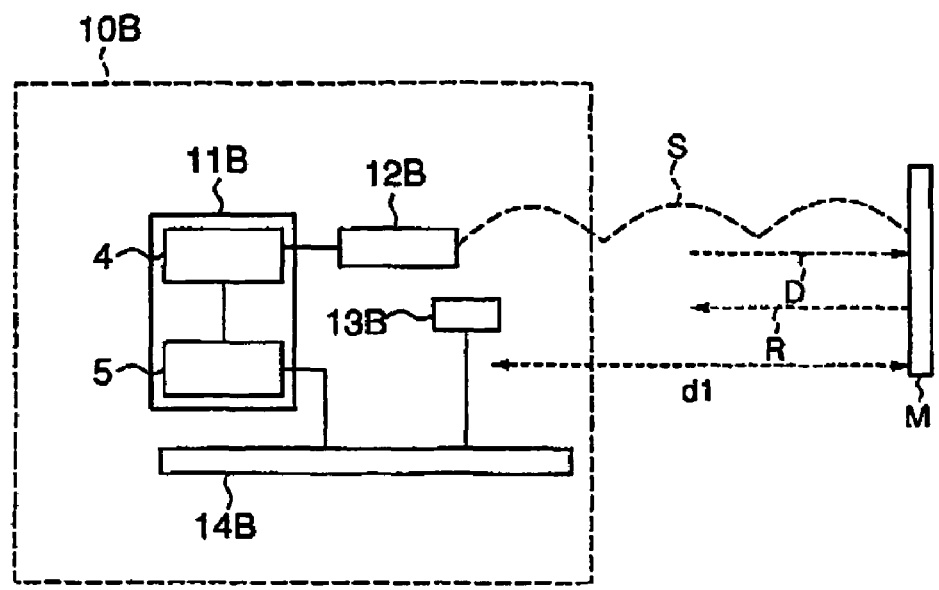
FIG. 5 is a block diagram for describing a distance measuring device according to a second preferred embodiment of the present invention.

Referring to FIG. 5, description will be made of a distance measuring device 10B according to a second preferred embodiment of the present invention.

The distance measuring device 10B comprises an electromagnetic wave generator 11B for producing an electromagnetic wave, a transmitter 12B connected to the electromagnetic wave generator 11B for transmitting the electromagnetic wave toward a measurement object M as a traveling wave D, a detector 13B disposed at a position offset from the transmitter 12B toward the measurement object M for detecting a standing wave S to produce a detection result, and a signal processor 14B connected to the detector 13B for, based on the detection result, calculating a distance (interval) d1 from the measurement object M to the detector 13B and a relative speed v between the distance measuring device 10B and the measurement object M.

The electromagnetic wave generator 11B comprises an emitting section 4 for emitting an electromagnetic wave, and a frequency control section 5 connected to the emitting section 4 and the signal processor 14B for controlling step by step a frequency of the electromagnetic wave emitted from the emitting section 4. As the emitting section 4, use may be made of, for example, an ac power supply that can output a signal having a constant frequency. The signal processor 14B further serves to control the frequency control section 5 to set the frequency of the electromagnetic wave to a predetermined value. The signal processor 14B, the electromagnetic wave generator 11B, and the transmitter 12B conjointly serve as the foregoing electromagnetic wave generating source A1, while the detector 13B and the signal processor 14B conjointly serve as the foregoing detection point A2.

As the transmitter 12B, use is made of, for example, a transmission antenna having an amplifier. The transmitter 12B transmits the electromagnetic wave emitted from the emitting section 4 into a propagation medium such as air or water, or into a vacuum as a traveling wave D. Therefore, when the frequency of the electromagnetic wave emitted from the emitting section 4 is changed by the frequency control section 5, the frequency of the traveling wave D is also changed naturally.

As the detector 13B, use is made of, for example, an antenna, an amplitude detector, or a square detector. The detector 13B detects the amplitude of the standing wave S. The detector 13B is adapted to output a current, a voltage, or the like that is, for example, equal to the amplitude of the standing wave S or proportional to the square of the amplitude as an amplitude signal representing the amplitude of the standing wave S.

The signal processor 14B comprises a recording section in the form of, for example, a digital signal processor (DSP) or a memory for recording inputted data, and an arithmetic section for calculating the data recorded in the recording section. The distance d1 and the relative speed v can be simultaneously calculated by the arithmetic section.

Further, the signal processor 14B receives, from the frequency control section 5, information relating to the frequency of the electromagnetic wave (hereinafter referred to simply as "frequency information") to thereby control the frequency control section 5, and sends a reception confirmation signal to the frequency control section 5 upon receipt of the amplitude signal from the detector 13B.

Incidentally, although the transmitter 12B and the detector 13B are provided separately, they may be unified together so as to share one antenna.

According to the distance measuring device 10B, the distance d1 and the relative speed v can be simultaneously calculated by the function of the arithmetic section of the signal processor 14B, and therefore, even if the relative speed v between the measurement object M and the distance measuring device 10B is not zero, i.e. either one of the measurement object M and the distance measuring device 10B is moving or both are moving at different speeds, it is possible to accurately carry out the measurement, which was difficult by the technique of Literature 1.

Therefore, if this distance measuring device 10B is mounted in, for example, a movable body such as a vehicle typified by an automobile or a train, or a sailing ship, it is possible to derive, apart from a distance and a relative speed with respect to an objective vehicle moving ahead, a speed of the objective vehicle moving ahead, and therefore, it can be employed in a rear-end collision prevention system, a system for keeping a constant distance relative to the objective vehicle moving ahead, or the like. Further, it is also possible to derive, apart from a distance and a relative speed with respect to a following objective vehicle, a speed of the following objective vehicle, and therefore, it can be employed in a parking support system, a collision prevention system for preventing collision with the following objective vehicle, a system for keeping a constant distance relative to the following objective vehicle, or the like. Apart therefrom, it can also be employed in a lateral support system with respect to obstacles on right and left sides.

The distance measuring device 10B is considered to be effectively utilized for driving support in a movable body, or the like. However, from the basic function thereof, it can derive a distance and a relative speed with respect to a measurement object such as a thing, a human being, or a living thing in any direction. Therefore, for a system thus configured, it is of course possible to utilize the distance measuring device 10B.

Now, description will be made of the operation of the distance measuring device 10B.

At the outset, when the frequency control section 5 causes the emitting section 4 to output a transmission signal having a frequency $f_G$, the transmitter 12B, responsive to receipt of the transmission signal, transmits a traveling wave D into the propagation medium toward the measurement object M. In this event, frequency information of the transmission signal is sent to the signal processor 14B from the frequency control section 5. The traveling wave D transmitted from the transmitter 12B is propagated in the propagation medium to reach the measurement object M, then is reflected on the measurement object M to become a reflected wave R which is then propagated in the propagation medium toward the transmitter 12B in a direction opposite to the traveling wave D. Consequently, the traveling wave D and the reflected wave R interfere with each other so that a standing wave S is formed in the propagation medium between the transmitter 12B and the measurement object M.

The amplitude of the standing wave S is detected by the detector 13B. The detector 13B sends an amplitude signal corresponding to the amplitude of the standing wave S to the signal processor 14B as a detection signal. Responsive to receipt of the detection signal, the signal processor 14B records, by the recording section, values of the detection signal in one-to-one correspondence with the frequency information of the output signal sent from the frequency control section 5, and simultaneously sends a reception confirmation signal to the frequency control section 5.

The frequency control section 5 changes the frequency of the transmission signal to be emitted from the emitting section 4, by the step frequency $\Delta f$ from the frequency $f_G$ at a constant interval that is longer than the time $\tau$ which is determined by the measurement range and in which the traveling wave D is reflected on the measurement object M and returns to the detector 13B as the reflected wave R. Consequently, the frequency of the traveling wave D transmitted from the transmitter 12B changes to $f_G+\Delta f$. However, since the traveling wave D is propagated at the constant speed (the velocity of light), the wavelength of the traveling wave D changes. Therefore, the standing wave S formed in the propagation medium between the transmitter 12B and the measurement object M changes so that the amplitude of the standing wave S detected by the detector 13B changes, and therefore, values of the detection signal sent to the signal processor 14B from the detector 13B change. The values of the detection signal are recorded by the recording section of the signal processor 14B in one-to-one correspondence with frequency information of the transmission signal outputted from the emitting section 4. Further, the frequency control section 5 changes the frequency of the transmission signal to be emitted from the emitting section 4 by the step frequency $\Delta f$ at the constant interval. In the electromagnetic wave generator 11B, such processing is repeated until the frequency of the transmission signal, i.e. the frequency of the traveling wave D, reaches or coincides with the frequency $f_G+f_B$ as shown in FIG. 4.

In the signal processor 14B, the arithmetic section produces the function of the foregoing basic equation from the frequency information of the output signal and the values of the detection signal recorded in the recording section and applies the Fourier transformation or the like to the produced function. As a result, the period of the function composed of the frequency information of the output signal and the detection signal can be calculated. Therefore, k1 given by the foregoing expression of relation 3 can be derived. Similarly, by changing the frequency from $f_G+f_B$ to $f_G$ as shown in FIG. 4, k2 given by the foregoing expression of relation 4 can be derived. Based on k1 and k2 thus derived, the foregoing distance d1 and relative speed v can be derived.

In case of the distance measuring device 10B, the distance d1 from the detector 13B to the measurement object M relies on the period of the amplitude of the standing wave S with respect to the frequency of the output signal, and is not affected by the time from a time instant of the transmission of the traveling wave D by the transmitter 12B to a time instant of the arrival of the reflected wave R at the detector 13B after the reflection of the traveling wave D on the measurement object M. Therefore, even if the distance d1 to the measurement object M is a short distance of several tens of centimeters or less, it can be accurately measured. On the other hand, when a plurality of measurement objects M exist so that a plurality of standing waves S are formed between the distance measuring device 10B and the plurality of measurement objects M, a detection signal obtained by the detector 13B corresponds to values each representing combination of amplitudes of the plurality of standing waves S. However, by applying the Fourier transformation or the like to the function of the basic equation composed of the frequency information of the output signal and the values of the detection signal recorded in the recording section of the signal processor 14B, variable periods of the amplitudes of the standing waves S can be respectively derived. Therefore, distances between the plurality of measurement objects M and the detector 13B can also be respectively measured.

The description has been given above about the case where the frequency of the transmission signal emitted from the emitting section 4 is changed from the initial frequency $f_G$ to $f_G+f_B$, then from $f_G+f_B$ to $f_G$. However, instead thereof, the measurement may be carried out by changing from $f_G$ to $f_G+f_B$, then again from $f_G$ to $f_G+f_B$, by changing from $f_G+f_B$ to $f_G$, then from $f_G$ to $f_G+f_B$, or by changing from $f_G+f_B$ to $f_G$, then again from $f_G+f_B$ to $f_G$. Further, the measurement may be carried out by changing from $f_G$ to $f_G+f_B$, then randomly from $f_G+f_B$ to $f_G$, or by changing like $f_G$, $f_G+f_B$, $f_G+\Delta f$, $f_G+f_B-\Delta f$, $f_G+2\Delta f$, $f_G+f_B-2\Delta f$, ..., $f_G+f_B$, $f_G$.

With respect to those equations given as the foregoing expression of relation 3 to expression of relation 6, it is necessary to apply values that satisfy the measurement condition. In addition, in the signal processor 14B, instead of deriving the periods of the amplitude of the standing wave S with respect to the frequencies of the output signal (transmission signal), two or more frequencies of the output signal (transmission signal) that make maximum and minimum the function defining the amplitude of the standing wave S may be derived to thereby derive the distance between the measurement object M and the transmitter 12B based on those derived frequencies.

Figure 6:
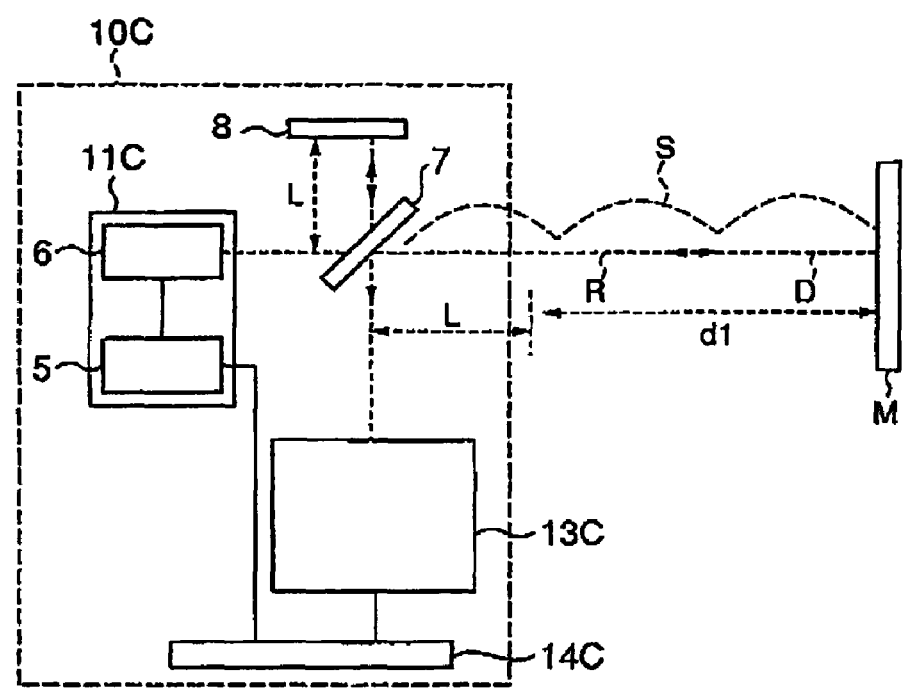
FIG. 6 is a block diagram for describing a distance measuring device according to a third preferred embodiment of the present invention.

Referring to FIG. 6, description will be made of a distance measuring device 10C according to a third preferred embodiment of the present invention.

The distance measuring device 10C comprises an electromagnetic wave generator 11C having a light emitting section 6 and a frequency control section 5 connected to each other, an optical device having a spectroscope 7 and a reflecting mirror 8, a detector 13C, and a signal processor 14C connected to the detector 13C and the frequency control section 5. The intensity of light, as an electromagnetic wave, to be emitted from the light emitting section 6 of the electromagnetic wave generator 11C is periodically changed by the signal processor 14C, thereby measuring a distance to a measurement object M using a standing wave S formed between the spectroscope 7 and the measurement object M.

Based on a detection signal produced by the detector 13C, a calculation is made of a distance d from the spectroscope 7 to the measurement object M, which becomes d1+L in FIG. 6 as will be described later in detail. The calculation method is the same as in case of the foregoing distance measuring device 10B.

As the light emitting section 6, use is made of, for example, a laser or a light emitting diode that can produce light emission so that a variation of the light intensity has a constant frequency. The frequency control section 5 is connected to the light emitting section 6 and has a function of controlling the frequency of the light intensity variation of the light emission from the light emitting section 6. Specifically, as a basic function, the frequency control section 5 can output information relating to the frequency of the light intensity variation of the light emission from the light emitting section 6 (e.g. a numerical value of the frequency of the light intensity variation of the light emission from the light emitting section 6), or a signal or the like having a frequency equal to the frequency of the light intensity variation of the light emission from the light emitting section 6.

The spectroscope 7 is disposed between the light emitting section 6 and the measurement object M and has a beam splitter and so forth. The spectroscope 7 splits light emitted from the light emitting section 6 into two beams and discharges one of the beams into a propagation medium existing between the spectroscope 7 and the measurement object M as a traveling wave D. Accordingly, a standing wave S is formed between the spectroscope 7 and the measurement object M in the same manner as described above with respect to the foregoing distance measuring device 10A or 10B. The spectroscope 7 further serves to reflect a return beam (a reflected beam as a reflected wave R) reflected from the measurement object M, toward the detector 13C.

The reflecting mirror 8 disposed on a lateral side of the spectroscope 7 reflects the other of the beams split by the spectroscope 7, again toward the spectroscope 7. The beam reflected by the reflecting mirror 8 passes through the spectroscope 7 and advances toward the detector 13C. That is, the return beam (reflected beam) reflected from the measurement object M and the beam reflected from the reflecting mirror 8 are sent together toward the detector 13C from the spectroscope 7.

The detector 13C is connected to the signal processor 14C and detects the amplitude of a light intensity variation representing the sums of the light intensities of both the return beam (reflected beam) reflected from the measurement object M and the beam reflected from the reflecting mirror 8, or detects the square of the amplitude thereof. The detector 13C comprises a device capable of obtaining an electrical signal corresponding to an incident light intensity, such as a photodetector that converts an incident light intensity to a voltage and outputs the voltage. From an electrical signal (detection signal) outputted from the photodetector, it is possible to output a current, a voltage, or the like that is equal to the amplitude SP of the light intensity variation, which can be deemed equivalent to the amplitude SP of the standing wave S, or that is proportional to the square of the amplitude SP of the light intensity variation.

The signal processor 14C comprises a recording section in the form of, for example, a digital signal processor (DSP) or a memory for recording inputted data, and an arithmetic section for calculating the data recorded in the recording section. The distance d (d1+L) from the spectroscope 7 to the measurement object M and the relative speed v therebetween can be simultaneously calculated by the arithmetic section. The signal processor 14C is also connected to the frequency control section 5 of the electromagnetic wave generator 11C as described above. To this end, the signal processor 14C receives, from the frequency control section 5, information relating to the frequency of the light (hereinafter referred to simply as "frequency information of the output signal") emitted from the light emitting section 6 of the electromagnetic wave generator 11C to thereby control the frequency control section 5, and sends a reception confirmation signal to the frequency control section 5 upon receipt of the detection signal from the detector 13C.

According to this distance measuring device 10C, it is possible to detect, by the detector 13C, the amplitude of the light intensity variation representing the sums of the light intensities of both the return beam (reflected beam) reflected from the measurement object M and the beam reflected from the reflecting mirror 8. This amplitude of the light intensity variation is equal in magnitude to the amplitude of a light intensity variation representing the sums of the light intensities, at the position of the spectroscope 7, of both the return beam (reflected beam) reflected from the measurement object M and the beam reflected from the reflecting mirror 8. This magnitude of the amplitude becomes equal to that of the amplitude of the standing wave S at a position offset by a distance L from the spectroscope 7 toward the measurement object M when a distance between the spectroscope 7 and the reflecting mirror 8 is L. Therefore, if the distance L between the spectroscope 7 and the reflecting mirror 8 is known, since it is possible to derive the distance d1 between the measurement object M and the position offset by the distance L from the spectroscope 7 toward the measurement object M, it is possible to simultaneously calculate the distance d (d1+L) from the spectroscope 7 to the measurement object M and the relative speed v between the distance measuring device 10C and the measurement object M by the arithmetic section of the signal processor 14C. Even if the relative speed v between the measurement object M and the distance measuring device 10C is not zero, i.e. either one of the measurement object M and the distance measuring device 10C is moving or both are moving at different speeds, it is possible to accurately carry out the measurement, which was difficult by the technique of Literature 1.

Incidentally, the signal processor 14C, the electromagnetic wave generator 11C, and the spectroscope 7 conjointly serve as the foregoing electromagnetic wave generator A1. The spectroscope 7, the reflectng mirror 8, the detector 13C, and the signal processor 14C conjointly serve as the foregoing detection point A2.

In the distance measuring device 10C, the optical device formed by the spectroscope 7 and the reflecting mirror 8 may have a configuration other than that illustrated in FIG. 6. As long as it is possible, by the detector 13C, to detect the amplitude of a light intensity variation representing the sums of the light intensities of both the beam emitted from the electromagnetic wave generator 11C toward the measurement object M and the return beam (reflected beam) reflected from the measurement object M, or detect the square of the amplitude thereof, another configuration may be employed such as using a partially reflecting mirror as an optical device. On the other hand, the light emitting section 6 of the electromagnetic wave generator 11C may be an infrared light emitting section that emits infrared light, and the optical device may be one that can discharge the infrared light as a traveling wave D. In this case, by variably controlling the frequency of the infrared light emitted from the infrared light emitting section so that the traveling wave D discharged by the optical device and a reflected wave R from the measurement object M interfere with each other to form a standing wave S, the amplitude of a light intensity variation or the square of the amplitude thereof may be derived by the detector 13C.

Figure 7:
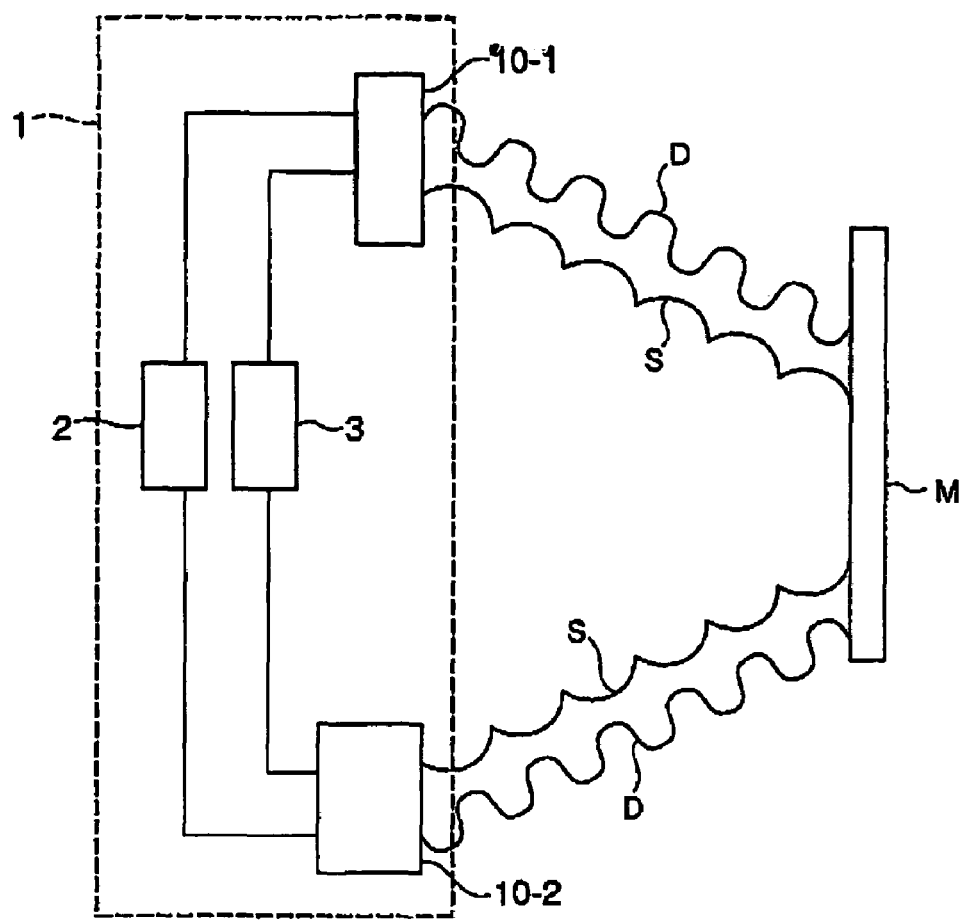
FIG. 7 is a block diagram for describing a distance measuring device according to a fourth preferred embodiment of the present invention.

Referring to FIG. 7, description will be made of a distance measuring device according to a fourth preferred embodiment of the present invention. In this embodiment, the whole of the distance measuring device shown in FIG. 7 is referred to as the distance measuring structure 1.

The distance measuring structure 1 comprises two distance measuring devices 10-1 and 10-2 each corresponding to the distance measuring device in any one of the foregoing embodiments, a controller 3 serving as a a synchronaization control section for controlling the distance measuring devices 10-1 and 10-2 to synchronize the processing of detecting the amplitudes of standing waves S and simultaneously calculating distances from a measurement object M to respective detectors of the distance measuring devices 10-1 and 10-2 and relative speeds v therebetween based on results about calculations of signals corresponding to the detected amplitudes, and an arithmetic unit 2 serving as a coordinate calculating section for calculating space coordinates of the measurement object M based on the distances respectively derived by the distance measuring devices 10-1 and 10-2 and a relative position between the detectors of the distance measuring devices 10-1 and 10-2.

The controller 3 operates the distance measuring devices 10-1 and 10-2 synchronously with each other so that electromagnetic waves are discharged into a propagation medium simultaneously from the distance measuring devices 10-1 and 10-2. The arithmetic unit 2 is inputted with the distances between the detectors and the measurement object M that are calculated by signal processors of the distance measuring devices 10-1 and 10-2. The space coordinates of the measurement object M can be calculated from the inputted distances and the relative position between the detectors of the distance measuring devices 10-1 and 10-2.

Figure 8:
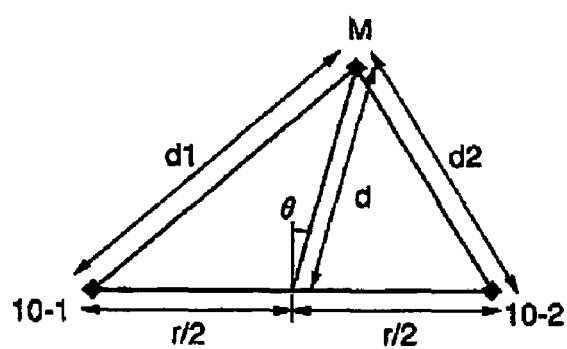
FIG. 8 is an explanatory diagram for explaining a measurement principle according to the distance measuring device shown in FIG. 7.

FIG. 8 is a schematic diagram showing a geometric relationship between the respective portions and the measurement object M for explaining a principle of distance measurement carried out by the distance measuring structure 1.

When the distance measuring devices 10-1 and 10-2 are synchronously controlled by the controller 3 to simultaneously discharge electromagnetic waves, standing waves S (S1, S2) are formed between the respective distance measuring devices 10-1 and 10-2 and the measurement object M so that calculations are made of distances d1 and d2 from the respective distance measuring devices 10-1 and 10-2 to the measurement object M and the relative speeds therebetween. When the calculated distances d1 and d2 are inputted into the arithmetic unit 2, the arithmetc unit 2, given that a distance between the distance measuring devices 10-1 and 10-2 is r as illustrated in FIG. 8, calculates a distance d from a middle point r/2 therebetween to the measurement object M using the following equation (11).

$$d=\{(d1)^2/2+(d2)^2/2+r^2/4\}^{1/2} \quad (11)$$

Then, a calculation is made of an angle θ formed between a bisector of a segment r between the distance measuring devices 10-1 and 10-2 and a segment connecting between the middle point r/2 and the measurement object M, using the following equation (12).

$$\sin\theta=\{(d1)^2-(d2)^2\}/2rd \quad (12)$$

Consequently, by employing the distance d derived by the equation (11) and the angle θ derived by the equation (12), it is possible to grasp a relative position among the distance measuring devices 10-1 and 10-2 and the measurement object M. Incidentally, if three or more distance measuring devices are provided, a positional relationship among the distance measuring devices and the measurement object M can be grasped three-dimensionally.

According to the distance measuring structure 1, if the distance measuring devices 10-1 and 10-2 are disposed, for example, at headlights or taillights of an automobile as one example of the movable body, the relative distance measurement can be effectively achieved. In this event, it is readily understood that an infrared light emitting section adapted to emit infrared light can be employed as a light emitting section, and the frequency of the infrared light can be variably controlled by a signal processor.

The present invention is applicable over a wide range of fields. For example, the present invention is effectively mounted in an artificial satellite or an airship.

What is claimed is:

1. A distance measuring method for measuring a distance between a distance measurement system and a measurement object, said method comprising the steps of:
   (1) sending a first electromagnetic wave toward said measurement object as a first traveling wave, said measurement object reflecting said first traveling wave to produce a first reflected wave;
   (2) changing a frequency of said first traveling wave;
   (3) detecting an amplitude of a first standing wave at a first position of said distance measurement system and producing a first amplitude signal representing the amplitude of said first standing wave, said first standing wave produced by interference between said first reflected wave and said first traveling wave; and
   (4) executing a first calculation using said first amplitude signal to derive a first distance between said first position and said measurement object and to derive a first relative speed between said first position and said measurement object.

2. The distance measuring method according to claim 1, further comprising the steps of:
   sending a second electromagnetic wave toward said measurement object as a second traveling wave so that said measurement object reflects said second traveling wave to produce a second reflected wave;
   changing a frequency of said second traveling wave;
   detecting an amplitude of a second standing wave at a second position of said distance measurement system and producing a second amplitude signal representing the amplitude of said second standing wave, said second standing wave produced by interference between said second reflected wave and said second traveling wave; and
   executing a second calculation using said second amplitude signal to derive a second distance between said second position and said measurement object and a second relative speed between said second position and said measurement object.

3. The distance measuring method according to claim 2, further comprising the step of synchronizing execution of said first calculation and execution of said second calculation.

4. The distance measuring method according to claim 2, further comprising the step of calculating space coordinates of said measurement object based on said first and second distances, said first and second relative speeds, and said first and second positions.

5. The distance measuring method according to claim 1, wherein said step (2) comprises changing the frequency of said first traveling wave stepwise.

6. The distance measuring method according to claim 5, wherein said step (3) is executed after a lapse of a predetermined time from a time instant when the frequency of said first traveling wave is changed.

7. The distance measuring method according to claim 6, wherein said predetermined time is set longer than a time from said time instant when the frequency of said first traveling wave is changed, to a time instant when said first traveling wave reaches said first position as said first reflected wave.

8. The distance measuring method according to claim 5, wherein the frequency of said first traveling wave is changed according to a predetermined pattern.

9. The distance measuring method according to claim 5, wherein the frequency of said first traveling wave is changed at random.

10. A distance measuring device for measuring a distance to a measurement object, said device comprising:
   a first electromagnetic wave generator for producing a first electromagnetic wave;
   a first transmission section connected to said first electromagnetic wave generator for sending said first electromagnetic wave toward said measurement object as a first traveling wave, wherein said measurement object reflects said first traveling wave to produce a first reflected wave;

a first frequency control section connected to said first electromagnetic wave generator for changing a frequency of said first traveling wave;

a first amplitude detecting section for detecting an amplitude of a first standing wave at a first position and producing a first amplitude signal representing the amplitude of said first standing wave, said first standing wave produced by interference between said first reflected wave and said first traveling wave; and a first arithmetic section connected to said first amplitude detecting section for executing a first calculation using said first amplitude signal to derive a first distance between said first position and said measurement object and a first relative speed between said first position and said measurement object.

11. The distance measuring device according to claim 10, further comprising:

a second electromagnetic wave generator for producing a second electromagnetic wave;

a second transmission section connected to said second electromagnetic wave generator for sending said second electromagnetic wave toward said measurement object as a second traveling wave, wherein said measurement object reflects said second traveling wave to produce a second reflected wave;

a second frequency control section connected to said second electromagnetic wave generator for changing a frequency of said second traveling wave;

a second amplitude detecting section for detecting an amplitude of a second standing wave at a second position and producing a second amplitude signal representing the amplitude of said second standing wave, said second standing wave produced by interference between said second reflected wave and said second traveling wave; and a second arithmetic section connected to said second amplitude detecting section for executing a second calculation using said second amplitude signal to derive a second distance between said second position and said measurement object and a second relative speed between said second position and said measurement object.

12. The distance measuring device according to claim 11, further comprising a synchronization control section connected to said first and second arithmetic sections for synchronizing execution of said first calculation and execution of said second calculation.

13. The distance measuring device according to claim 11, further comprising a coordinate calculating section connected to said first and second arithmetic sections for calculating space coordinates of said measurement object based on said first and second distances, said first and second relative speeds, and said first and second positions.

14. The distance measuring device according to claim 10, wherein said first frequency control section comprises a stepwise control section that changes the frequency of said first traveling wave stepwise.

15. The distance measuring device according to claim 14, further comprising a detection control section connected to said first amplitude detecting section and said stepwise control section for causing said first amplitude detecting section to execute detection of the amplitude of said first standing wave after a lapse of a predetermined time from a time instant when the frequency of said first traveling wave is changed.

16. The distance measuring device according to claim 15, further comprising a time setting section connected to said detection control section and said first frequency control section for setting said predetermined time to be longer than a time from said time instant when the frequency of said first traveling wave is changed, to a time instant when said first traveling wave reaches said first position as said first reflected wave.

17. The distance measuring device according to claim 14, wherein said first frequency control section changes the frequency of said first traveling wave according to a predetermined pattern.

18. The distance measuring device according to claim 14, wherein said first frequency control section changes the frequency of said first traveling wave at random.

19. The distance measuring device according to claim 10, wherein said first electromagnetic wave generator comprises a light emitting section for emitting light, as said first electromagnetic wave, of which a light intensity changes periodically, said first electromagnetic wave generator is an optical device having a function of transmitting therethrough at least part of said light and discharging it as said first traveling wave, and said first frequency control section controls the frequency of said light.

20. A distance measuring structure for measuring a distance to a measurement object, said structure comprising:

a plurality of distance measuring devices each according to claim 10;

a synchronization control device connected to said distance measuring devices for synchronizing operations of said first arithmetic sections provided in said distance measuring devices, respectively; and a coordinate calculating device connected to said distance measuring devices for calculating space coordinates of said measurement object based on said first distances and said first relative speeds derived in said distance measuring devices, respectively, and a positional relationship of said first amplitude detecting sections provided in said distance measuring devices, respectively.

21. The distance measuring method according to claim 1, wherein the steps 1–4 are performed sequentially.

* * * * *

UNITED STATES PATENT AND TRADEMARK OFFICE
CERTIFICATE OF CORRECTION

PATENT NO. : 7,233,388 B2 Page 1 of 1
APPLICATION NO. : 10/827248
DATED : June 19, 2007
INVENTOR(S) : Shingo Fujimori It is certified that error appears in the above-identified patent and that said Letters Patent is hereby corrected as shown below:

Column 2, line 18, please change "JP-A-H06-10082" to -- JP-A-H06-160082 --.

Signed and Sealed this

Twenty-fourth Day of March, 2009

JOHN DOLL
*Acting Director of the United States Patent and Trademark Office*